United States Patent [19]

Imai et al.

[11] Patent Number: 5,007,147
[45] Date of Patent: Apr. 16, 1991

[54] CONTROL SYSTEM FOR STEPLESSLY VARIABLE POWER TRANSMISSION

[75] Inventors: Shoji Imai; Yoshimi Kanemoto, both of Hiroshima, Japan

[73] Assignee: Mazda Motor Corporation, Hiroshima, Japan

[21] Appl. No.: 527,711

[22] Filed: May 22, 1990

Related U.S. Application Data

[63] Continuation of Ser. No. 302,198, Jan. 27, 1989, abandoned.

[30] Foreign Application Priority Data

Jan. 29, 1988 [JP] Japan .................................. 63-18910

[51] Int. Cl.⁵ .............................................. B60K 41/18
[52] U.S. Cl. ........................................ 74/866; 74/868
[58] Field of Search .................. 74/866, 867, 868, 869

[56] References Cited

U.S. PATENT DOCUMENTS

| | | | |
|---|---|---|---|
| 4,547,178 | 10/1985 | Hayakawa et al. ............... | 74/867 X |
| 4,569,254 | 3/1986 | Itoh et al. ............................. | 74/866 |
| 4,610,183 | 9/1986 | Nobumoto et al. .................... | 74/866 |
| 4,651,595 | 3/1987 | Miyawaki ............................. | 74/866 |
| 4,665,775 | 5/1987 | Nagamatsu et al. .................... | 74/868 |
| 4,671,138 | 6/1987 | Nobumoto et al. ............. | 74/866 X |
| 4,671,140 | 6/1987 | Koshio .................................. | 74/868 |
| 4,673,377 | 6/1987 | Akutagawa ............................. | 474/1 |
| 4,701,853 | 10/1987 | Osanai .............................. | 74/866 X |
| 4,730,518 | 3/1988 | Miyawaki ............................. | 74/866 |
| 4,764,155 | 8/1988 | Kumura et al. ....................... | 474/12 |
| 4,784,021 | 11/1988 | Morimoto ............................. | 74/868 |
| 4,796,489 | 1/1989 | Nagamatsu et al. .................... | 74/868 |
| 4,803,900 | 2/1989 | Ohkumo ............................... | 74/866 |
| 4,831,898 | 5/1989 | Miyawaki ............................. | 74/866 |
| 4,833,944 | 5/1989 | Tanaka ................................. | 74/866 |

FOREIGN PATENT DOCUMENTS 58-191360  11/1983  Japan .

*Primary Examiner*—Allan D. Herrmann
*Assistant Examiner*—Ryan Massey
*Attorney, Agent, or Firm*—Fleit, Jacobson, Cohn, Price, Holman & Stern

[57] ABSTRACT

A steplessly variable power transmission includes a load change detecting device for detecting a change speed in an engine load when an engine load zone to which a value of the engine load belongs is changed from an intermediate zone to a specific zone other than the intermediate zone. A speed ratio hold device is provided for maintaining the speed ratio at a constant value determined in accordance with the change speed in the engine load obtained through the load detecting device and for providing the speed ratio control means with the constant value of the speed ratio as a control signal. The speed ratio is fixed at a value in accordance with change speed in an acceleration pedal stroke under a kick down and engine brake conditions.

8 Claims, 9 Drawing Sheets

CHANGE SPEED IN THROTTLE OPENING

CHANGE SPEED IN THROTTLE OPENIG

CONTROL SYSTEM FOR STEPLESSLY VARIABLE POWER TRANSMISSION

This application is a continuation of application Ser. No. 07/302,198, filed Jan. 27, 1989 now abandoned.

The present application relates to co-pending U.S. Pat. application Ser. No. 90,514 filed on Aug. 28, 1987, now U.S. Pat. No. 4,817,458 entitled "BELT-PULLEY TYPE STEPLESSLY VARIABLE TRANSMISSION ASSEMBLY" which is assigned to the same assignee as the present application.

BACKGROUND OF THE INVENTION

FIELD OF THE INVENTION

The present invention relates to a control system for a steplessly variable power transmission, and more specifically to a control for fixing a speed ratio in the transmission under a predetermined ending operating condition.

DESCRIPTION OF THE PRIOR ART

There has been known a steplessly variable power transmission provided with a pulley mechanism as an engine power transmission mechanism having a primary pulley member connected with an engine and a secondary pulley member connected with vehicle wheels with the primary and secondary pulley members being connected through a belt member. In this mechanism, a speed ratio between the first and second pulley members can be steplessly changed so as to control the speed ratio in the transmission mechanism. The speed ratio in the transmission is usually determined based on a vehicle speed, engine speed, engine load and the like.

Japanese Patent Public Disclosure No. 58-191360, laid open to the public on Nov. 8, 1983, discloses a steplessly variable power transmission and a control method therefor. In this transmission when a stroke of a acceleration pedal is abruptly reduced, the speed ratio in the transmission is maintained for a certain period at a value just before the acceleration pedal stroke is reduced so that an engine brake effect can be obtained. This control for fixing the speed ratio as taught by the Japanese patent application provides passengers with a smooth feeling of deceleration. U.S. Pat. No. 4,610,183 discloses a similar control system for a steplessly variable power transmission. In addition, U.S. Pat. Nos. 4,665,775, 4,671,138, 4,671,140, 4,673,377 and 4,796,489 disclose controls for belt-pulley type steplessly variable power transmissions.

It should however, be noted that a stroke and speed in an operation of the acceleration pedal applied by a driver depends on a driver's decision. Therefore, it is desirable that the speed ratio in the transmission is controlled in accordance with the driver's decision. In this regard, control as disclosed in Japanese Patent Public Disclosure No. 58-191360 is disadvantageous in that the driver cannot always obtain a desirable feeling through the acceleration pedal operation because the speed ratio in the transmission is fixed regardless of the amount of the stroke and the speed of the acceleration pedal operation.

SUMMARY OF THE INVENTION

It is therefore an object of the present invention to provide a control system for a steplessly variable power transmission which can always provide a driver with a desirable speed ratio in accordance with the driver's request which is exerted through an acceleration pedal operation.

It is another object of the present invention to provide a control system for a steplessly variable power transmission which can provide an appropriate speed ratio in the case of a kick down operation.

It is still another object of the present invention to provide a control system for a steplessly variable power transmission which can provide an appropriate speed ratio in the case of a full release operation of the acceleration pedal.

The above and other objects of the present invention can be accomplished by a steplessly variable power transmission comprising a steplessly variable transmission mechanism in which a speed ratio is steplessly changed between an input shaft and an output shaft provided in the transmission and speed ratio control means for controlling the speed ratio in accordance with an engine operating condition. A load change detecting means detects a change speed in an engine load when an engine load zone to which a value of the engine load belongs is changed from an intermediate zone to a specific zone other than the intermediate zone. Speed ratio hold means maintains the speed ratio at a constant value determined in accordance with the change speed in the engine load obtained through the load detecting means and providing the speed ratio control means with the constant value of the speed ratio as a control signal.

In a preferred embodiment, the specific zone is an engine load zone in which a kick down operation of the transmission is carried out. Alternatively the specific zone can be determined as an engine load zone covering an engine load in the case where an acceleration pedal is fully released.

Preferably, when a control is carried out so as to maintain the speed ratio at the constant value determined in accordance with the change speed in the engine load, the speed ratio is controlled so as to gradually move toward the constant value while an engine speed is suppressed below a predetermined value.

According to the present invention, when an engine load is changed in such a manner that an engine load zone into which a value of the engine load falls is changed from an intermediate zone to a specific zone other than the intermediate zone, the speed ratio of the transmission is fixed. In this case, the value of the speed ratio fixed depends on a change rate or speed in the case where the engine load is changed.

For instance, when a kick down operation is carried out, the speed ratio is maintained at a constant value which provides a transmitted rotation ratio (rotation speed of output member/rotation speed of input member) of the transmission with a relatively small value. The constant value of the speed ratio depends on a speed of a movement of a throttle valve, i.e., the speed of the acceleration pedal operation applied by the driver. When the speed of the acceleration pedal operation is high, it is considered that the driver desires high acceleration. In this case, the speed ratio (output speed/input speed) is controlled so as to take a small value which provides a low gear stage. On the other hand, when the acceleration pedal operation speed is small, it is considered that the driver does not want to get an abrupt acceleration. In this case, a relatively big value of the speed ratio is provided for a higher gear stage.

When the acceleration pedal is released, the speed ratio in the transmission is determined in accordance with a releasing speed in an acceleration pedal operation. When the releasing speed is great, it is considered that the driver wants to get a great braking effect. Therefore, the speed ratio is maintained at a relatively small value which provides a lower gear stage. On the other hand when the releasing speed of the acceleration pedal is small, it is not considered that the driver wants to get a strong braking effect of the vehicle. In this case, the speed ratio is maintained at a relatively big constant value which provides a higher gear stage. This control for the speed ratio in the transmission can be carried out in combination with an engine speed control wherein the engine speed is suppressed below a predetermined value when the speed ratio control is carried out.

The above and other features of the present invention will be apparent from the following description taking reference to the accompanying drawings.

DESCRIPTION OF THE PREFERRED EMBODIMENT

Figure 1:
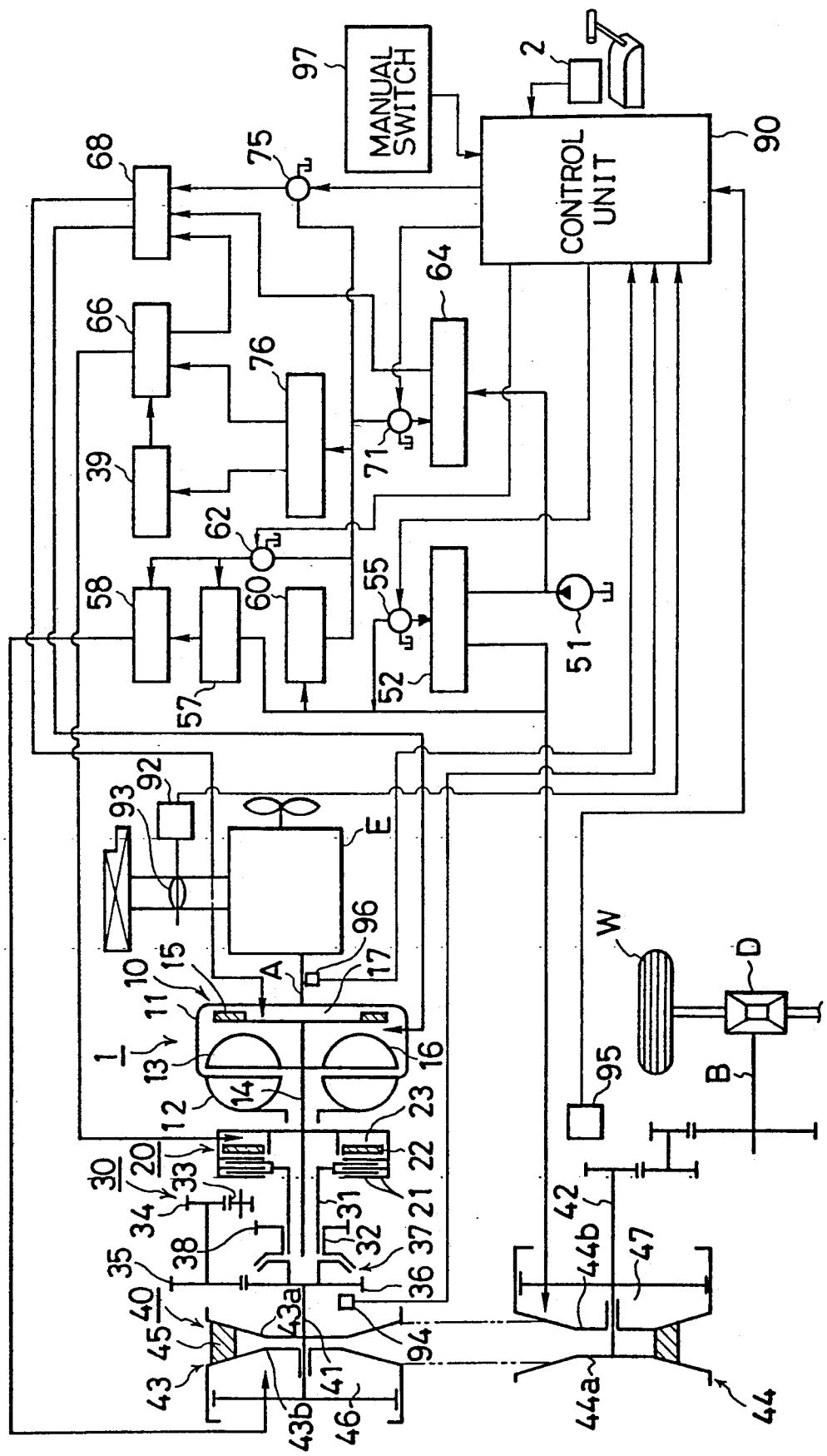
FIG. 1 is a schematic view of a control system for a steplessly variable power transmission in accordance with the present invention.

Referring to the drawings, specifically to FIG. 1, a steplessly variable power transmission 1 in accordance with the present invention is provided with a fluid coupling 10 connected with an output shaft A of an engine E, a drive clutch 20 connected with an output side of the fluid coupling 10 and a switching mechanism 30 connected with the output side of the fluid coupling for switching a drive mechanism of a vehicle between a forward movement therefor and a reverse movement, and a belt-pulley mechanism 40 for transmitting an output torque from the drive mechanism to an output shaft B. The output shaft B is adapted to transmit a drive torque to vehicle wheels W through a differential gear mechanism.

The fluid coupling 10 is provided with a pump 12 arranged within a case 11 connected with the output shaft A with the pump 12 being adapted to rotate together with the output shaft A, a turbine 13 arranged within the case 11 facing to the pump 12 and driven by power transmitted from the pump 12 through a hydraulic fluid filled up in the case 11, an output shaft 14 connected with the turbine 13, and a lock-up clutch 15 connected with the output shaft 14 and adapted to be engaged with and disengaged from the case 11 so that the output shaft 14 is engaged directly with and disengaged from the output shaft A of the engine E. The lock-up clutch 15 is adapted to be engaged for transmitting the drive torque therethrough when the hydraulic pressure is introduced into an engaging chamber 16 and disengaged when the hydraulic pressure is introduced into a releasing chamber 17.

The drive clutch 20 is provided with a plurality of clutch plates 21 arranged between the output shaft 14 of the fluid coupling 10 and an input shaft 31 of the switching mechanism 30 and a piston 22 for engaging and disengaging the clutch plates 21.

The switching mechanism 30 is provided with a switching member 32 slidably engaged with the input shaft 31, and a first through fourth gear 33, 34, 35 and 36 constituting a gear train. When the switching member 32 is located at a position as shown in FIG. 1, the switching mechanism 30 connects the input shaft 31 with an input shaft 41 of the belt-pulley mechanism 40 through a clutch mechanism 37. When the switching member 32 is moved to the right from the position shown in FIG. 1, a gear 38 of the member 32 is meshed with the first gear 33 of the gear train to cause the input shaft 31 to rotate inversely for transmitting the drive torque to the input shaft 41.

The belt-pulley mechanism 40 is provided with a primary pulley 43 disposed on the input shaft 41 and a secondary pulley 44 disposed on the output shaft 42 extending in parallel with the input shaft 41 and a belt 45 which is engaged with both the primary pulley 43 and the secondary pulley 44.

The primary pulley 43 is provided with a stationary conical member 43a mounted on the input shaft 41 and a movable conical member 43b slidably mounted on the shaft 41 wherein conical surfaces thereof face to each other. When the movable conical member 43b approaches the stationary member 43a, an effective pitch diameter of the belt 45 is increased. Likewise, the secondary pulley 44 is provided with a stationary conical member 44a and a movable conical member 44b. The movable conical member 44b can move on the output shaft 42 so that an effective pitch diameter of the belt 45 is changed on the output shaft 42.

There are provided hydraulic cylinders 46 and 47 behind the movable conical members 43b, 44b for controlling the displacement of the members 43b and 44b.

When hydraulic pressure of the cylinder 46 for the primary pulley 43 increases the effective pitch diameter of the primary pulley 43 is increased and the effective pitch diameter of the secondary pulley 44 is reduced so that the speed ratio (rotation speed of the output shaft/rotation speed of the input shaft) of the variable power transmission 1 is increased to provide a higher stage.

To the contrary, when the hydraulic pressure of the cylinder 46 is reduced, the speed ratio is reduced to provide a lower gear stage.

A hydraulic pressure is introduced into the hydraulic cylinder 47 of the secondary pulley 44 for maintaining a proper tension of the belt 45.

Figure 2:
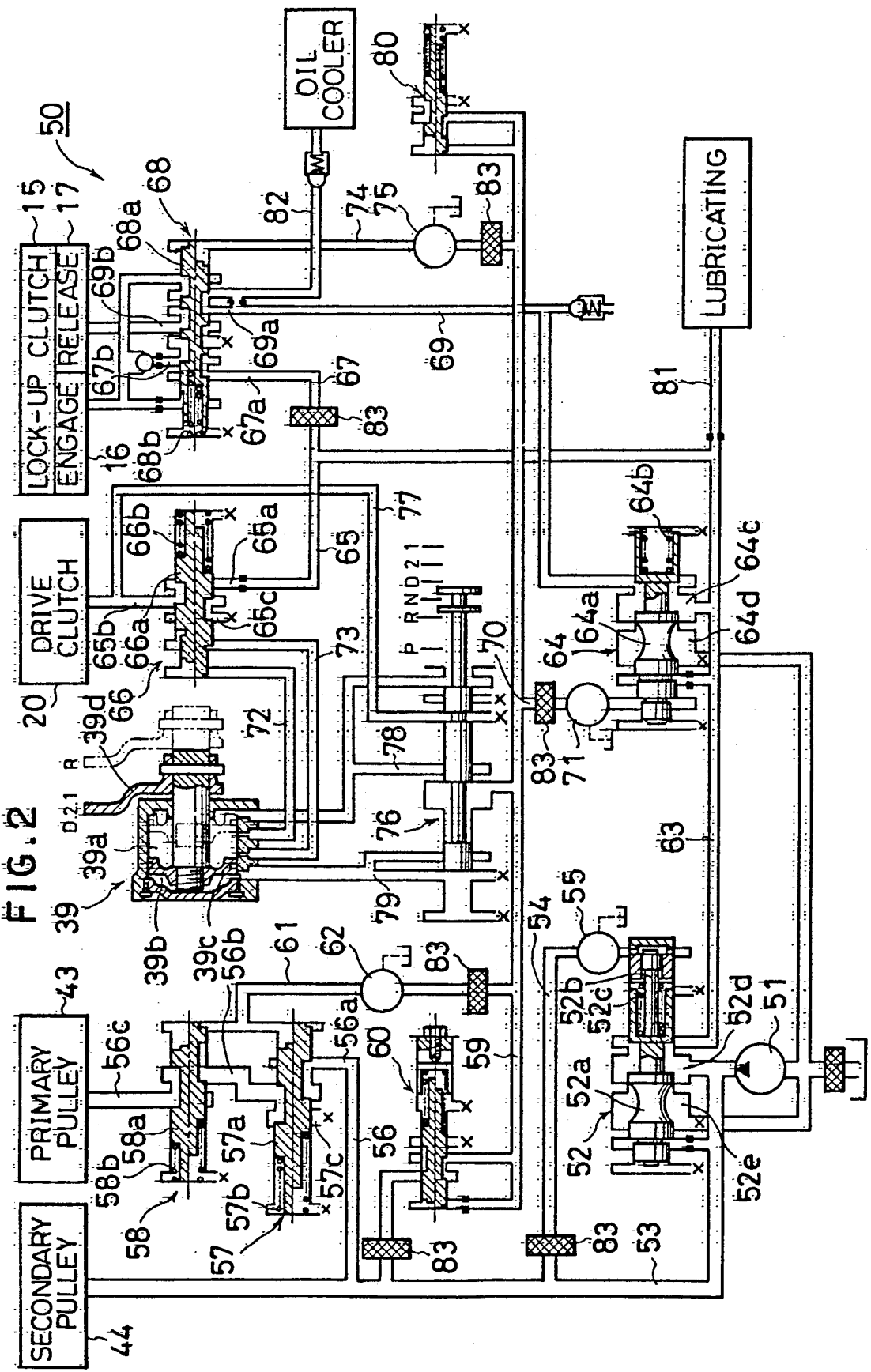
FIG. 2 is a view showing a hydraulic control mechanism.

Additionally referring to FIG. 2, hereinafter, there is described a hydraulic control mechanism 50 for controlling operations of the lock-up clutch 15, drive clutch 20, primary pulley 43 and secondary pulley 44, and an actuator 39 of the switching mechanism for forward movement and reverse movement.

The hydraulic control mechanism 50 is provided with an oil pump 51 driven by the engine E. A pressure of a hydraulic fluid discharged from the pump 51 is adjusted by a pressure regulator valve or a secondary pressure valve 52 to a predetermined value and introduced into the cylinder 47 for the secondary pulley 44 through a line 53. The secondary pressure valve 52 is provided with a main spool 52a, an auxiliary spool 52b disposed serially with the main spool 52a, a spring 52c disposed between the spools 52a and 52b for biasing the main spool 52a in one direction, and formed at a middle portion thereof with a pressure adjusting port 52d into which the hydraulic pressure from the pump 51 is directly introduced, and with a drain port 52e adjacent to the pressure adjusting port 52d. At one end of the auxiliary spool 52b is introduced in the same direction as the resilient force of the spring 52c a pilot pressure regulated by a duty solenoid valve 55 on a line 54 separated from the line 53. The hydraulic pressure of the line 53 acts on one end of the main spool 52a in a direction opposite to that of the resilient force of the spring 52c and the pilot pressure. The main spool 52a is moved in accordance with a balance of forces acting on the main spool 52a and the auxiliary spool 52b so that a communication of the pressure adjusting port 52d with the drain port 52e is controlled. As a result, the hydraulic pressure in the line 53 or a secondary pressure is adjusted at a value corresponding to the pilot pressure. A hydraulic pressure of a line 56 separated from the line 53 is introduced into the cylinder 46 for the primary pulley 43 through first and second shift control valves 57 and 58. The first and second shift control valves 57 and 58 are provided with spools 57a and 58a and springs 57b and 58b biasing each of the spools 57a and 58a in one direction. On one end of each of the spools 57a and 58a acts a pilot pressure reduced by a reducing valve 60 on a line 59 separated from the line 53 and adjusted by a second duty solenoid valve 62 on a line 61 in directions opposite to those of resilient forces of the springs 57b and 58b. The resilient force of the spring 57b for the first shift control valve 57 is greater than that of the spring 58b for the second shift control valve 58. When the pilot pressure acting on the spools 57a and 58a is greater than a predetermined value, the spools 57a and 58a are located at positions as shown by upper half hatched portions in the valves 57 and 58 in FIG. 2 respectively wherein an upstream portion 56a of the line 56 is interrupted by the spool 57a and an intermediate portion 56b and downstream portion of the line 56 are communicated with a drain port 57c of the first shift control valve 57. When the pressure acting on the spools 57a and 58a is reduced below the predetermined value, the spool 57a of the first shift control valve 57 is moved to a position shown by a hatched lower half portion in the valve 57 in FIG. 2 so that the upstream portion 56a of the line 56 is communicated with the intermediate portion 56b of the line 56. This causes the hydraulic pressure in the line 53 to be introduced into the cylinder 46 for the primary pulley 43 through the first and second shift control valves 57 and 58. When the pilot pressure acting on the spools 57a and 58a is further reduced, the spool 58a of the second shift control valve 58 is likewise moved to a position shown by a hatched lower half portion in the valve 58 in FIG. 2 so that communication between the intermediate portion 56b of the line 56 and the downstream portion 56c of the line 56 is interrupted.

As a result, the hydraulic pressure in the cylinder 46 for the primary pulley is held. Thus, the hydraulic pressure introduced into the cylinder 46 is controlled in accordance with the pilot pressure acting on the spools 57a and 58a so that the speed ratio in the belt-pulley mechanism 40 can be controlled.

Further, the hydraulic pressure from the secondary valve 52 is introduced into a line 63 and to a clutch pressure valve 64 in which the hydraulic pressure is adjusted at a predetermined clutch pressure which is introduced, on one hand, into the oil chamber 23 of the drive clutch 20 through a line and a drive clutch control valve 66, and on the other hand, into the case 11 or the engaging chamber 16 of the fluid coupling 10 through a line 67 and a lock-up clutch control valve 68. Further, a hydraulic pressure is introduced from the clutch pressure valve 64 into a line 69 and into the releasing chamber 17 of the fluid coupling 10 through the lock-up clutch control valve 68.

The clutch pressure valve 64 is provided with a spool 64a and a spring 64b for biasing the spool 64a in one direction, and formed at a middle portion with a pressure regulating port 64c and a drain port 64d adjacent to the pressure regulating port 64c.

On one end of the auxiliary spool 52b is introduced, in a direction opposite to that of the resilient force of the spring 64b, a hydraulic pressure in the line 63 and a pilot pressure regulated by a third duty solenoid valve 71 on a line 70 separated from the line 59. The spool 64a is moved in accordance with a balance of forces acting thereon so that a communication of the pressure adjusting port 64c with the drain port 64d is controlled. As a result, the hydraulic pressure in the line 53 or the clutch pressure is controlled in accordance with the pilot pressure acting on the spool 64a.

The drive clutch control valve 66 is provided with a spool 66a and a spring 66b for biasing the spool 66a in one direction. When a hydraulic pressure is applied to one end of the spool 66a from the actuator 39 for the forward and reverse switching mechanism 30 through lines 72 and 73, the spool 66a is moved to a position shown by a hatched upper half portion in the valve 66 in FIG. 2 so that an upstream portion 65a is communicated with a downstream portion 65b of the line 65. As a result, the clutch pressure is introduced into the drive clutch 20 through the drive clutch control valve 66. When the hydraulic pressure from the actuator 39 is interrupted, the spool 66a is moved to a position shown by a hatched lower half portion in the valve 66 in FIG. 2 so that the downstream portion 65b is communicated with the drain port 65c causing the hydraulic fluid from the drive clutch 20 to be rained therethrough. Thus, the drive clutch 20 is engaged and disengaged in accordance with the hydraulic pressure from the actuator 39.

The lock-up clutch control valve 68 is provided with a spool 68a and a spring 68b for biasing the spool 68a in one direction. To one end of the spool 68a is applied, in a direction opposite to that of a resilient force of the spring 68b, a pilot pressure adjusted by a fourth duty solenoid valve 75 disposed on a line 74 separated from the line 59. When the pilot pressure is increased beyond the resilient force of the spring 68b, the spool 68a is moved to a position shown by a hatched lower half portion of valve 68 in FIG. 2 so that an upstream portion 67a of the line 67 is communicated with a downstream portion 67b. As a result, a hydraulic pressure is introduced into the engaging chamber 16. On the other hand, when the resilient force of the spring 68b is greater than the pilot pressure, the spool 68a is located at a position shown by a hatched upper half portion in valve 68 in FIG. 2 so that the upstream line 69a of the line 69 is communicated with the downstream line 69b thereof. As a result, a hydraulic pressure is introduced into the releasing chamber 17. Thus, the lock-up clutch 15 is engaged and disengaged in accordance with the value of the pilot pressure.

In the preferred embodiment, the pilot pressure is controlled precisely by the fourth duty solenoid valve 75 so as to balance with the resilient force of the spring 68b so that the hydraulic pressure of the engaging chamber 16 is substantially balanced with that of the releasing chamber 17. This enables a slip control of the lock-up clutch 15 wherein the lock-up clutch transmits the drive torque allowing a certain slippage therein.

The hydraulic control mechanism 50 is further provided with a select valve 76 for selecting one or several shift ranges in accordance with an operation of the driver. When a N range and a P range are selected, the select valve 76 causes a line 77 separated from a downstream portion 65b of the line 65 connected with the drive clutch 20 to be drained for disengaging the drive clutch 20.

In a D, 2, and 1 ranges, which provide for the forward movement of the vehicle, the select valve 76 interrupts the line 77 to keep the drive clutch 20 engaged and establishes communication between the line 59 communicated with the reducing valve 60 and a line 78 communicated with a forward port 39a of the hydraulic actuator 39. In the R range, the select valve 76 communicates the line 59 with a line 79 communicated with a reverse port 39b of the actuator 39. When a hydraulic pressure is introduced into the forward port 39a, a piston of the actuator 39 is moved to a position shown by a real line so that the actuator 39 moves the switching member 32 of the switching mechanism 30 through a shift fork to a position where the input shaft 3 of the switching mechanism 30 is directly engaged with the input shaft 41 of the belt pulley mechanism 40. When the hydraulic pressure is introduced into the reverse port 39b to move the piston 39c to a position shown by a chain line, the actuator 39 moves the switching member 32 to a position where the input shaft 31 of the switching mechanism 30 is engaged with the input shaft 41 of the belt pulley mechanism 40 through the gears 38, 33 through 36. The actuator 39 communicates one of the ports 39a and 39b to which the hydraulic pressure is introduced with the lines 72 and 73 communicated with the drive clutch control valve 66 when the piston 39c is positioned at either the forward position shown by the real line or the reverse position shown by the chain line so as to supply the valve 66 with a hydraulic pressure. When the piston 39c is being moved between the forward and reverse positions during a switching operation for the forward and reverse movement, the actuator 39 stops temporarily a supply of the hydraulic pressure from the lines 72 and 73 to the drive clutch control valve 66. Thus, the spool 66a of the drive clutch control valve 66 is moved in accordance with the operation of the actuator 39 so that the clutch pressure for the drive clutch 20 is controlled to engage the clutch 20 in the forward and reverse movements and disengage it during the switching operation between the forward and reverse movements.

There is provided a relief valve 80 at an end portion of the line 59. A line 81 separated from the line 63 is connected with lubricating parts of the transmission to supply the hydraulic fluid thereto. A line 82 communicated with the lock-up clutch control valve 68 is connected with an oil cooler. There are placed an appropriate number of oil filters 83 at a predetermined positions in the hydraulic mechanism 50.

There is provided a control unit 90 for controlling the hydraulic pressure of the hydraulic cylinders 46, 47 to thereby control the speed ratio in the transmission 1.

Figure 3:
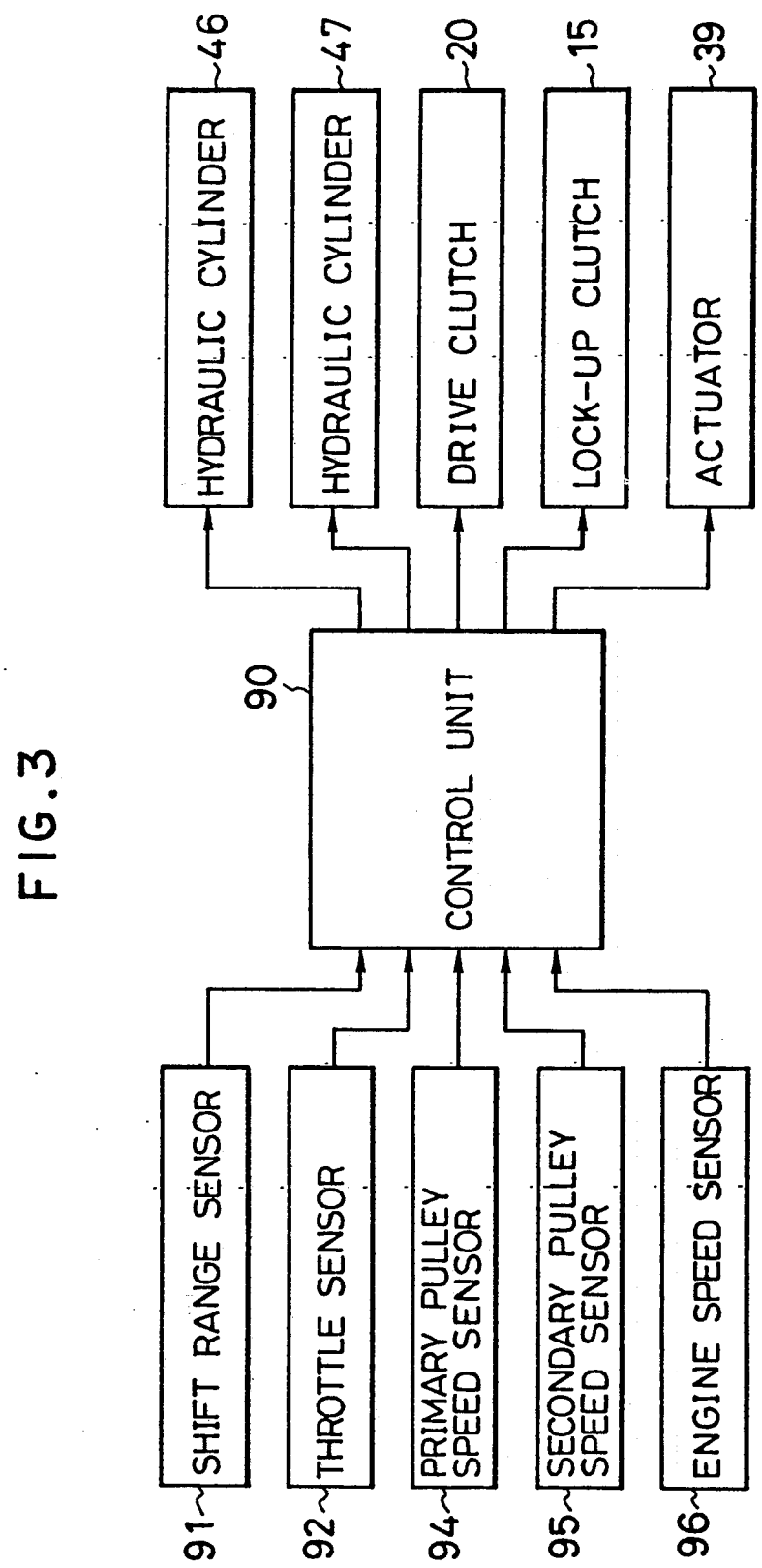
FIG. 3 is a block chart showing a control unit in accordance with a preferred embodiment of the present invention.

As shown in FIG. 3, the control unit 90 receives signals from a shift range sensor 91 for detecting a shift range selected, a throttle sensor 92 for detecting an opening of a throttle valve 93, a primary pulley speed sensor 94 for detecting a rotation speed of the primary pulley 43, a secondary pulley speed sensor 95 for detecting a rotation speed of the secondary pulley 44, a engine speed sensor 96 for detecting an engine speed, and a manual switch 97 for fixing the speed ratio.

The control unit 90 receives signals from the above sensors and carries out duty controls for the first through fourth duty solenoid valves 55, 62, 71 and 75 to control the pilot pressures introduced into the first and second shift ratio control valves 57 and 58, the clutch pressure valve 64 and the lock-up clutch control valve 68, thereby controlling the secondary pressure introduced into the secondary pulley 44 ( controlling the tensional force of the belt 45), the speed ratio control by controlling the hydraulic pressure actuating the primary pulley 43, the drive clutch 20 and the lock-up clutch 15.

Hereinafter, there is described a control of the belt-pulley transmission in accordance with the present invention.

The control is carried out in accordance with a control program prepared and stored in the control unit 90.

The control program is constituted by a main program which sets initial values of variables when the engine starts and controls interrupt routines and a monitor program, and an interrupt program for controlling the various routines which interrupt the main program and are carried out at predetermined timings.

Figure 4:
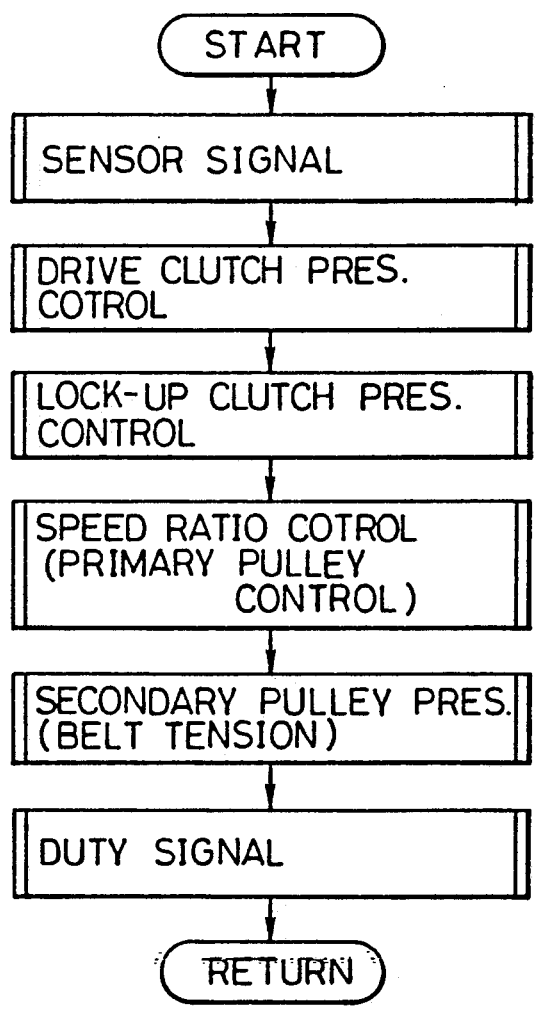
FIG. 4 is a flow chart of various interrupt routines.

As shown in FIG. 4, the interrupt program includes a read routine for reading various signals from the sensors, a drive clutch pressure control routine for controlling the drive clutch 20, a lock-up clutch pressure control routine for controlling the lock-up clutch 15, a speed ratio control routine for controlling the hydraulic cylinder 46 for the primary pulley 43, a secondary pressure control routine for controlling the hydraulic pressure of the cylinder 47 for the secondary pulley to thereby control the tensional force of the belt 45 and a duty signal producing routine for producing duty pulse signals for the first through fourth duty solenoid valves 55, 62, 71 and 75.

Figure 5:
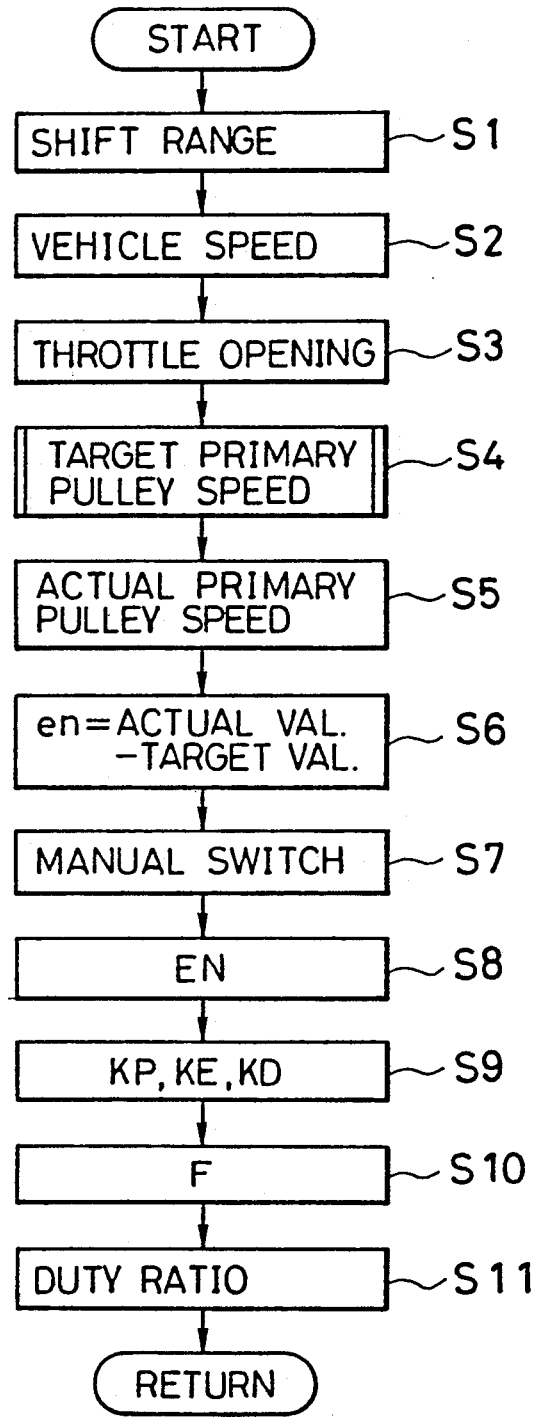
FIG. 5 is a flow chart of a control for controlling the duty solenoid.

Referring to FIG. 5, there is shown a flow chart of the speed ratio control routine which forms a part of the interrupt program.

In FIG. 5, the control unit 90 reads values of the shift range, vehicle speed and throttle opening based on the shift range sensor 91, throttle sensor 92 and secondary pulley speed sensor 95 (S1, S2 and S3).

Figure 7:
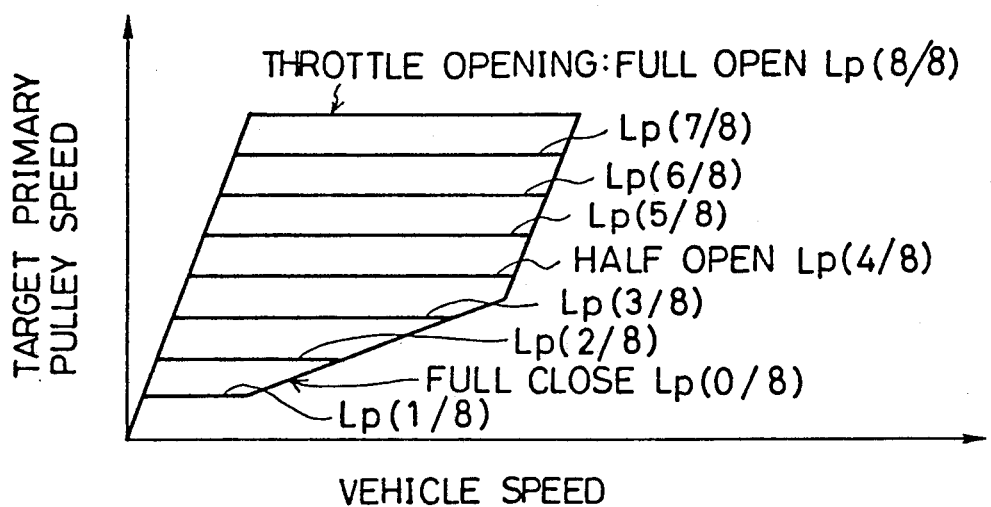
FIG. 7 is a graphical representation showing a target primary pulley speed and vehicle speed.

Then, the control unit 90 gets a target primary pulley speed in light of a map as shown in FIG. 7 providing the target primary pulley speed in relation with the vehicle speed and the throttle opening obtained in the preceding steps S1, S2, S3 (S4).

The control unit 90 reads an actual rotation speed of the primary pulley 43 based on the primary pulley speed sensor 94 (S5). Then the control unit 90 calculates a difference en between the target primary pulley speed and the actual primary pulley speed (S6). The next step (S7) the control unit 90 reads a signal from the manual switch 97 denoting a driver's request for fixing the speed ratio in accordance with an operation applied by the driver thereto. The control unit gets a difference parameter EN which is determined based on the value of the difference en (S8). In this case, the difference parameter EN may take a smaller value than the absolute value of the difference en when the target primary pulley speed is smaller than the actual primary pulley speed and take a larger value than the value of the difference en when the target primary pulley speed is greater than the actual primary pulley speed.

In this embodiment, a feedback control is carried out about the speed ratio. For this purpose, constants KP, KI, KD are determined for providing a feed back control gain F (S10).

The gain F is provided in accordance with a following equation;

$$F = F1 + KP(EN-EN1) + KI \cdot EN + KD(EN-2EN1+EN2),$$

Wherein F1 is the control gain in the preceding cycle,

KP,KI,KD; are constants for the PID proceeding of the feedback control,

EN is the value of the difference parameter in the current cycle,

EN1 is the value of the difference parameter in the preceding cycle, and,

EN2 is the value of the difference parameter in the second cycle preceding the current cycle.

Figure 8:
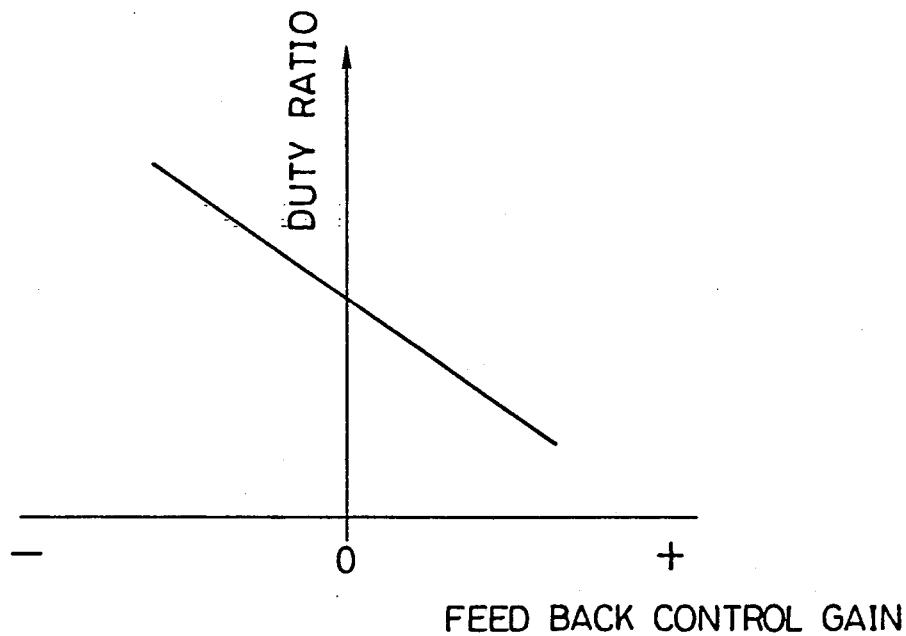
FIG. 8 is a graph for providing a duty ratio in relation with a feedback control gain.

Then, the control unit 90 calculates a duty ratio based on the value of the gain F in accordance with a map as shown in FIG. 8.

Hereinafter, there is described a speed ratio control under a specific engine operating condition.

Figure 6:
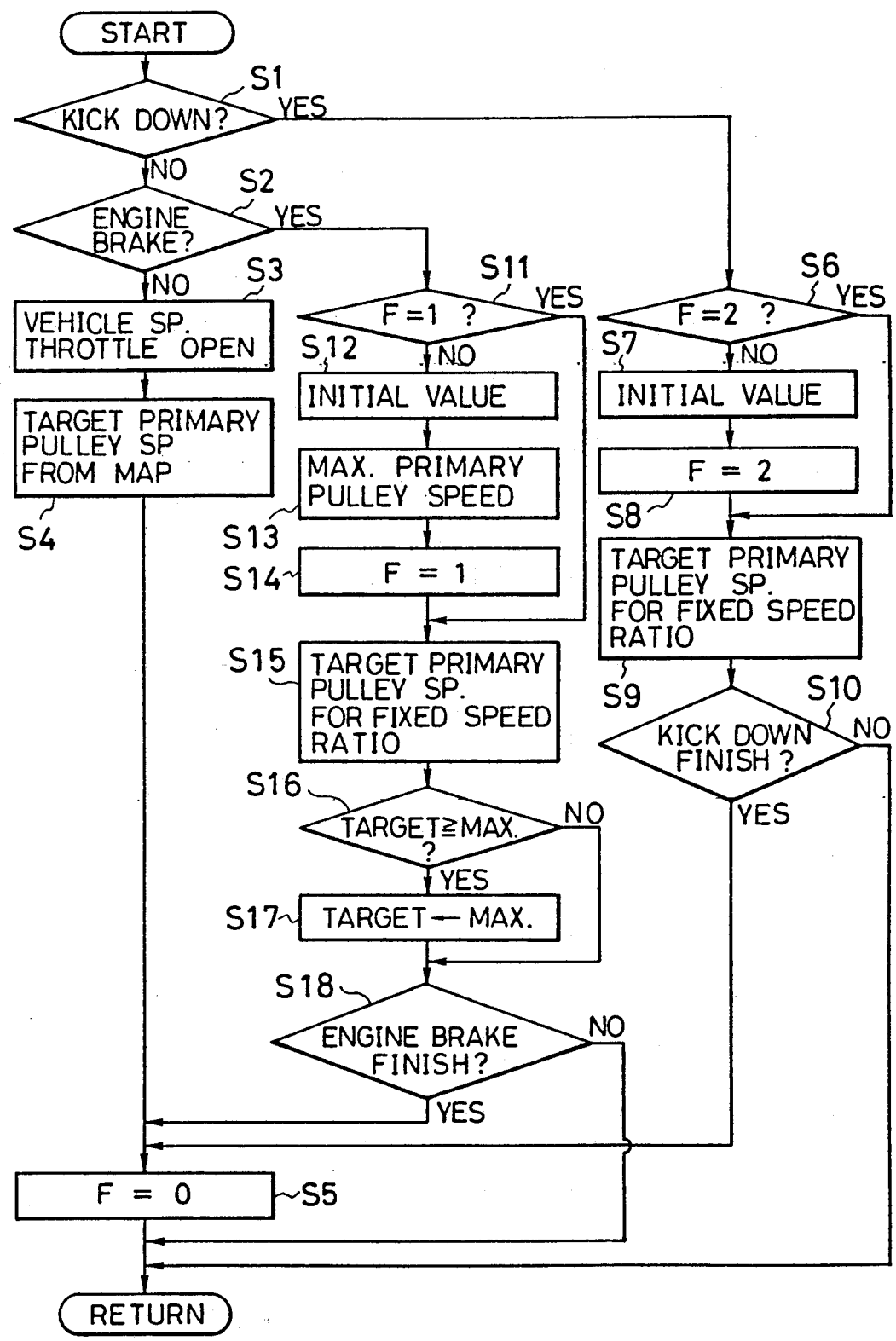
FIG. 6 is a flow chart of a speed ratio control under specific conditions.

Referring to FIG. 6, the control unit 90 finds that the engine operating condition is under a kick down condition when the throttle opening is more than a predetermined value such as a value corresponding to ¾ of a full engine load (S1) wherein a value of 8/8 which means a fully opened position of the throttle valve 93 which corresponds to the full engine load and a value of 0/8 which means an entirely closed position of the throttle valve which corresponds to no engine load. The next step the control unit 90 finds that engine braking is requested. In other words, the engine operating condition is in an engine brake control condition when the throttle opening is reduced so as to be smaller than a value of ⅛ (S2) by reducing a stroke for the acceleration pedal.

In the steps S1, S2, when both the kick down condition and the engine brake control condition are not found, the control unit 90 reads a value of the throttle opening (S3), and obtains a target primary pulley speed based on values of the vehicle speed and the throttle opening detected in accordance with the map shown in FIG. 7 (S4). In FIG. 7, lines Lp(0/8), Lp(⅛) through Lp(8/8) denote throttle openings which provide engine output values for no load, ⅛ through 8/8 of the engine load respectively wherein the lines Lp(⅛) through Lp(8/8) are substantially straight and parallel with one another.

Then, the control unit 90 produces a duty signal based on the value of the target primary pulley speed to control the duty solenoid valve 62 to thereby control a hydraulic pressure introduced into the cylinder 46.

Thus, the speed ratio of the transmission 1 can be controlled.

In the above condition, there is neither operation of the kick down nor a reduction in the acceleration stroke. In this case, the control unit 90 provides a flag F for judging the specific condition with a value of F=0 (S5).

Hereinafter, there is described a control in the case where a kick down operation is made.

When the kick down operation occurs, the judgment in step S1 is Yes. The control unit 90 carries out a step (S6) to judge whether or not the flag takes a value of F=2 which means that the engine operating condition is in a kick down condition.

Figure 9:
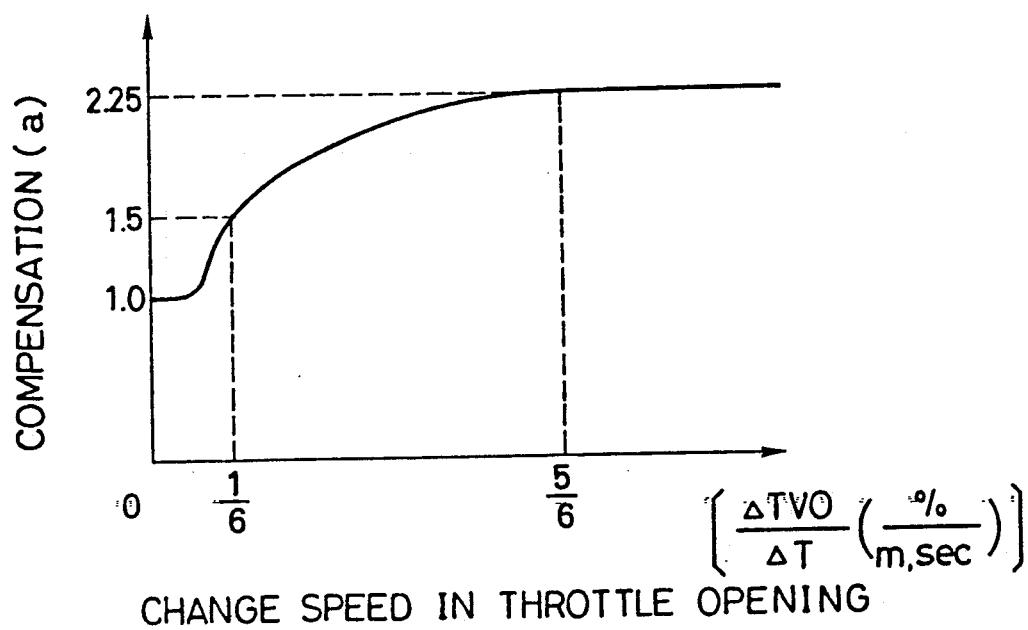
FIG. 9 is a graph for providing a compensation for a speed ratio.

When the judgment is No, this means that the engine operation is changed to the kick down condition for the first time in the current proceeding cycle of the routine. In this case, the control unit 90 determines an amount of (a) compensation a in the speed ratio R (output shaft 41 rotation speed/ input shaft 42 rotation speed of the transmission) for providing a proper lower gear stage in accordance with the kick down operation (S7) wherein the compensation a is provided in accordance with a speed in a throttle opening change (dTvo/dt) as shown in FIG. 9. The speed ratio R changes from approximately 2.25 (lowest gear stage) to 0.44 (highest gear stage or over drive gear stage). The speed ratio R is provided by the following equation;

$$R = R1 \cdot a,$$

wherein R1 is a speed ratio before the kick down operation is detected.

Then, the control unit 90 sets the flag F at the value of F=2 (S8). In the next step (S9), the control unit calculates a target value of a primary pulley rotation speed based on the vehicle speed and the speed ratio R which provides the lower gear stage and is fixed when the engine operating condition is in the kick down condition. In step S6, when the judgment is Yes, this means that the engine operating condition is in a kick down condition. In this case, the control unit 90 carries out the step S9 without setting a value of the flag F to get a target value of the primary pulley rotation speed to be held during kick down condition.

When the throttle opening is reduced below the predetermined value such as a value of ¾, the kick down condition is found to be finished providing the flag F with a value of F=0.

According to the kick down control of the illustrated embodiment, the speed ratio R to be held is changed in accordance with a change speed in the stroke of the acceleration pedal or in the throttle opening.

Figure 10:
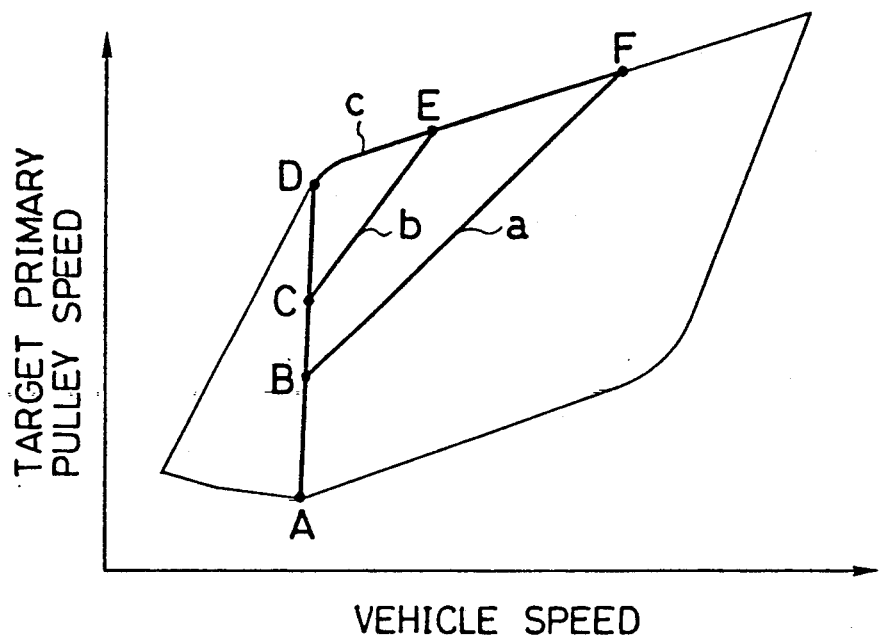
FIG. 10 is a graph showing a control property of the primary pulley speed under a kick down control.

For instance, when a kick down operation is carried out in an engine operating condition as shown by a point A in FIG. 10, a compensation a for reducing a speed ratio R providing a lower gear stage is reduced where the change speed in the throttle opening is relatively small. In this case, a target primary pulley rotation speed for providing a constant speed ratio R is set at a small value as shown by a point B in FIG. 10. When the vehicle speed is increased with the constant speed ratio R, the target primary pulley speed is increased along the substantially straight line a connecting the point B with a point F in FIG. 10.

When the change speed in the throttle opening is increased, a larger value as shown by such as a point C is provided for a target primary pulley speed so that a larger compensation a is set for the speed ratio R providing a further lower gear stage. In this case, when the vehicle speed is increased, the target primary pulley speed is increased along a substantially straight line b connecting the point C with a point E with a constant speed ratio R.

If the control for fixing the speed ratio R is not carried out, the primary pulley speed would change along for example a curved line c connecting points A, B, C, D, E, and F. It should be however noted that the driver will not get riding comfort because of an abrupt increase of the primary pulley speed.

On the contrary, under the kick down control according to the illustrated embodiment of the present invention, the speed ratios R to be fixed are provided in accordance with the change speeds in the throttle opening respectively so that the primary pulley speed is determined in relation with the vehicle speed so as to provide the respective constant speed ratios R. Therefore, according to the control of the illustrated embodiment, a shift control can be accomplished in accordance with the driver's request for acceleration of the vehicle without an abrupt increase of the primary pulley speed.

In FIG. 10, when a reduction of the stroke of the acceleration pedal or a reduction of the throttle opening occurs, the judgment in the step S2 is Yes so that the control unit 90 in turn judges whether or not the Flag F has a value of F=1 which means that the acceleration pedal stroke is reduced by operation of the driver thereto (S11).

If the judgment in step S11 is No, this means that the reduction of the acceleration stroke is detected for the first time in the current proceeding cycle.

Figure 11:
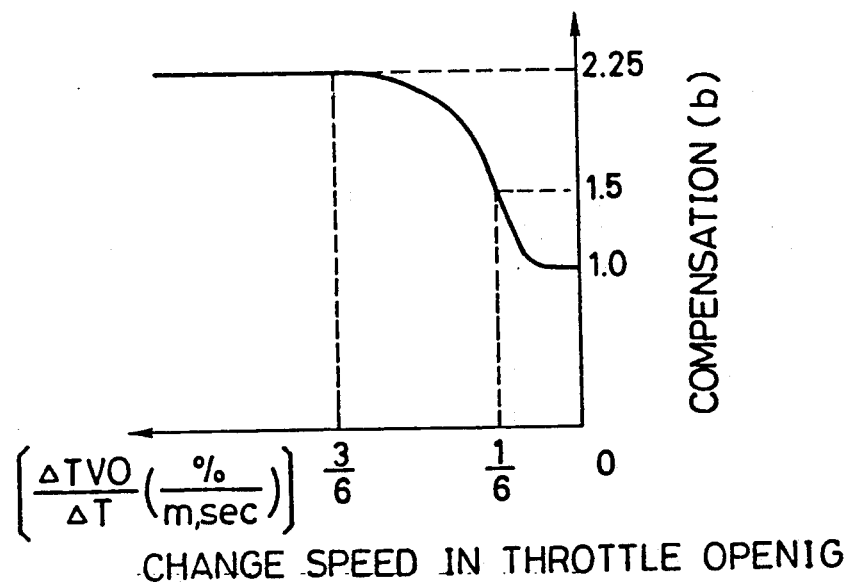
FIG. 11 is a graph for providing a compensation for a speed ratio.

In this case, the control unit 90 determines a compensation b of a speed ratio R for providing a lower gear stage in accordance with a necessity for an engine brake effect (S12) wherein the compensation b is provided in accordance with a speed in a throttle opening change (dTvo/dt) as shown in FIG. 11. The speed ratio R is provided by the following equation;

R=R1*b, wherein R1 is a speed ratio before the reduction in the acceleration pedal stroke is detected.

Then, the control unit 90 sets a maximum value of the primary pulley rotation speed by adding a constant α relating to a value of the compensation b to a current primary pulley speed in order to avoid an undue increase of the primary pulley speed (S13) and sets the flag F at a value F=1 (S14).

The control unit 90 determines a target value of the primary pulley rotation speed for providing a constant speed ratio R (S15). In this case, when the target primary pulley rotation speed is greater than the maximum value, the control unit 90 sets the target value at the maximum value (S16, S17). Thus, the control unit 90 carries out an engine brake control for fixing the speed ratio R until the throttle opening is increased more than a predetermined value (S18).

Hereinafter, there is described an engine brake control carried out when the acceleration pedal is released to reduce the acceleration stroke for getting an engine brake effect taking reference with FIG. 12.

Figure 12:
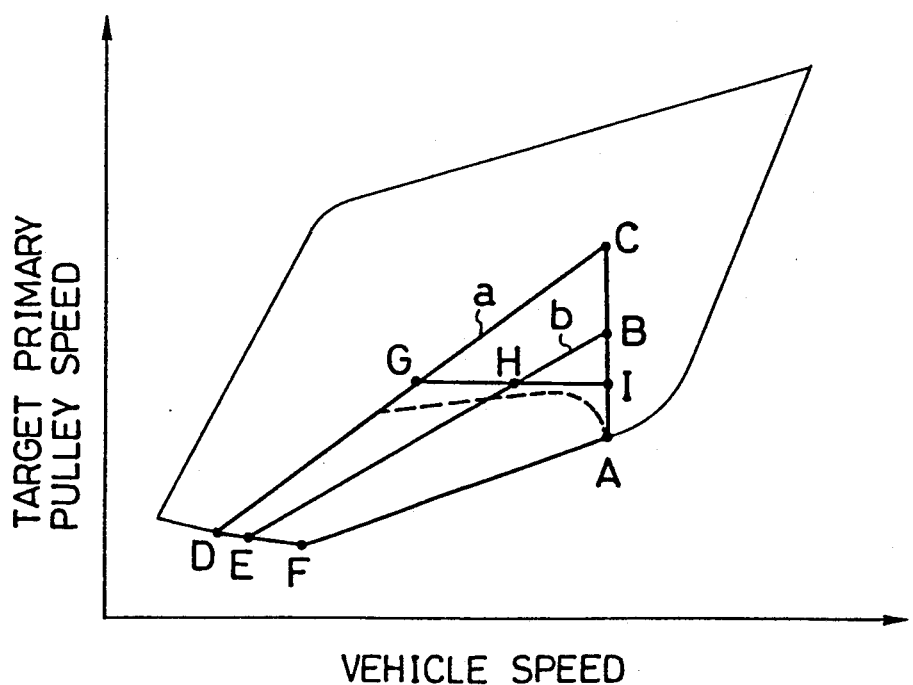
FIG. 12 is a graph showing a control property of the primary pulley speed under an engine brake control.

When an abrupt reduction in the acceleration pedal stroke occurs in the case where an engine operating condition is in a condition as shown by a point A in FIG. 12, the control unit 90 provides a relatively small value for a constant speed ratio R for providing a lower gear stage wherein a control is initialized at an engine operating condition as shown by a point C and the primary pulley speed is reduced along a substantially straight line a connecting the point C with a point D in FIG. 12 as the vehicle speed is reduced.

On the other hand, when a slow reduction in the acceleration stroke occurs, the control unit 90 provides for example an initial value of a primary pulley speed as shown by a point B and the primary pulley speed is reduced along a substantially straight line b connecting the point B with a point E in FIG. 12 when the vehicle speed is reduced during the engine brake control.

To the contrary, when the speed ratio R is not fixed at the time of the reduction of the acceleration pedal stroke unlike the illustrated embodiment of the present invention, the speed ratio is provided based on the map as shown in FIG. 12 as a curved property connecting A, F, E and D. It should however be noted that a desirable engine brake effect could not be obtained by this control in which the speed ratio is not fixed.

When the primary pulley speed is controlled to be suppressed below a predetermined maximum value as aforementioned in the case where the acceleration pedal is released to reduce the stroke, the primary pulley speed changes along a property connecting points I, H and E or points I, G and D. In this case, starting points of the control for fixing the speed ratio are points H, G respectively. With this control, an undue increase of the engine speed can be prevented by restricting the maximum value of the primary pulley speed to improve a riding comfort.

In this control, the primary pulley speed can be controlled to change along a broken line in FIG. 12 so that an abrupt change in the primary pulley speed can be prevented.

It will be apparent that various modifications and improvements may be made based on the above descriptions by those skilled in the art without departing from the scope of the claims as attached.

We claim:

1. A steplessly variable power transmission comprising:
   a steplessly variable transmission mechanism in which a speed ratio between an input shaft and an output shaft provided in the transmission is steplessly changed,
   speed ratio control means for controlling the speed ratio in accordance with an engine operating condition,
   load change detecting means for detecting a rate of change in an engine load when an engine load zone to which a value of the engine load belongs is changed from an intermediate zone to a specific zone other than the intermediate zone, and
   speed ratio hold means for maintaining the speed ratio at a constant value determined in accordance with the rate of change in the engine load obtained through the load change detecting means and providing the speed ratio control means with control signals determining the constant value of the speed ratio.

2. A steplessly variable power transmission in accordance with claim 1 wherein the specific zone is an engine load zone in which a kick down operation of the transmission is carried out.

3. A steplessly variable power transmission in accordance with claim 1 wherein the specific zone is determined as an engine load zone covering an engine load in the case where an acceleration pedal is fully released.

4. A steplessly variable power transmission in accordance with claim 1 wherein the speed ratio is controlled gradually toward the constant value while an engine speed is suppressed below a predetermined value when a control is carried out so as to maintain the speed ratio at the constant value determined in accordance with the change speed in the engine load.

5. A steplessly variable power transmission comprising:
- a steplessly variable transmission mechanism in which a speed ratio between an input shaft and an output shaft provided in the transmission is steplessly changed,
- speed ratio control means for controlling the sped ratio in accordance with an engine operating condition,
- load change detecting means for detecting a rate of change in an engine load when an engine load zone to which a value of the engine load belongs is changed from an intermediate zone to a specific zone other than the intermediate zone, and
- speed ratio hold means for maintaining the speed ratio at a constant value determined in accordance with the rate of change in the engine load obtained through the load change detecting means and providing the speed ratio control means with control signals determining the constant value of the speed ratio, the specific zone including an engine load zone in which a kick down operation of the transmission is carried out and another engine load zone including an engine load occurring when an acceleration pedal is fully released.

6. A control method for a steplessly variable power transmission provided with a steplessly variable transmission mechanism in which a speed ratio between an input shaft and an output shaft provided in the transmission is steplessly changed and speed ratio control means for controlling the speed ratio in accordance with an engine operating condition, comprising steps of:
- detecting a rate of change in an engine load when an engine load zone to which a value of the engine load belongs is changed from an intermediate zone to a specific zone other than the intermediate zone,
- maintaining the speed ratio at a constant value determined in accordance with the rate of change in the engine load obtained through the load detecting means, and
- providing the speed ratio control means with control signals determining the constant value of the speed ratio.

7. A control method in accordance with claim 6 wherein the specific zone is an engine load zone in which a kick down operation of the transmission is carried out.

8. A control method in accordance with claim 6 wherein the specific zone is determined as an engine load zone including an engine load occurring when an acceleration pedal is fully released.

* * * * *